(12) United States Patent
Kunimochi (10) Patent No.: US 9,915,772 B2
(45) Date of Patent: Mar. 13, 2018

(54) DISPLAY BACK ILLUMINATION APPARATUS HAVING COMPRESSION MOLDED LIGHT GUIDE

(71) Applicant: MINEBEA CO., LTD., Kitasaku-gun, Nagano (JP)

(72) Inventor: Toru Kunimochi, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 279 days.

(21) Appl. No.: 14/752,197

(22) Filed: Jun. 26, 2015

(65) Prior Publication Data

US 2016/0109634 A1    Apr. 21, 2016

(30) Foreign Application Priority Data

Oct. 15, 2014  (JP) .................................. 2014-210850

(51) Int. Cl.
*G02B 6/00* (2006.01)
*F21V 8/00* (2006.01)

(52) U.S. Cl.
CPC ........... *G02B 6/005* (2013.01); *G02B 6/0065* (2013.01); *G02B 6/0088* (2013.01)

(58) Field of Classification Search
CPC ............. F21V 2200/15; F21V 2200/20; G02B 6/0086; G02B 6/0088; G02B 6/0035; G02B 6/0038
See application file for complete search history.

(56) References Cited

U.S. PATENT DOCUMENTS

| | | | | |
|---|---|---|---|---|
| 6,426,763 B1* | 7/2002 | Sagawa | ................ | G02B 6/0086 346/65 |
| 6,471,388 B1* | 10/2002 | Marsh | .................. | G02B 6/0031 313/318.11 |
| 8,853,942 B1* | 10/2014 | Lewis, Jr. | ................. | F21V 7/04 313/612 |
| 8,944,668 B2* | 2/2015 | Kuromizu | ............ | G02B 6/0088 349/58 |
| 9,250,377 B2* | 2/2016 | Wu | ...................... | G02B 6/0088 |
| 9,645,305 B2* | 5/2017 | Seo | ...................... | G02B 6/0088 |
| 2001/0050847 A1* | 12/2001 | Suzuki | ................ | G02B 6/0028 362/633 |
| 2009/0097277 A1* | 4/2009 | Iwasaki | ................ | G02B 6/0091 362/628 |

(Continued)

FOREIGN PATENT DOCUMENTS

JP    H-10-48427 A    2/1998
JP    2002-292687 A    10/2002
(Continued)

*Primary Examiner* — Ismael Negron
(74) *Attorney, Agent, or Firm* — Oliff PLC (57) ABSTRACT

The illumination apparatus includes a light guide plate, a light source disposed opposing an incident light surface of the light guide plate, at least one optical sheet stacked on a light emitting surface of the light guide plate, and a frame for accommodating the light guide plate. On principal surfaces of the light guide plate, a protruding part and a recessed part are provided so as to form a pair at least along an end surface of the light guide plate extending in a direction that intersects an end surface serving as the incident light surface of the light guide plate, or along an end surface that opposes the incident light surface of the light guide plate.

21 Claims, 7 Drawing Sheets

(56) References Cited

U.S. PATENT DOCUMENTS

| | | | | |
|---|---|---|---|---|
| 2012/0113674 A1* | 5/2012 | He | ............... | G02F 1/133608 |
| | | | | 362/606 |
| 2016/0091657 A1* | 3/2016 | Yang | ............ | G02F 1/133615 |
| | | | | 362/608 |
| 2016/0356950 A1* | 12/2016 | Zhou | ............ | G02F 1/1335 |
| 2016/0370538 A1* | 12/2016 | Chu | ............ | G02B 6/0088 |
| 2017/0045676 A1* | 2/2017 | Zhou | ............ | G02F 1/1335 |

FOREIGN PATENT DOCUMENTS

| JP | 2009-034894 A | 2/2009 |
|---|---|---|
| JP | 2009-131976 A | 6/2009 |
| JP | 2011-165677 A | 8/2011 |
| JP | 2013-44988 A | 3/2013 |

* cited by examiner

DISPLAY BACK ILLUMINATION APPARATUS HAVING COMPRESSION MOLDED LIGHT GUIDE

BACKGROUND OF THE INVENTION

1. Field of the Invention

The present invention relates to a spread illuminating apparatus used as an illumination unit of a liquid crystal display device or the like.

2. Description of the Related Art

Liquid crystal display devices are now regularly used as display devices of electronic apparatuses such as personal computers and mobile telephones. Liquid crystal is not a self-luminous display element, and thus an illumination unit for irradiating light onto the liquid crystal panel is required in, for example, a transmissive-type liquid crystal display device. Even in a semitransmissive-type liquid crystal display device that utilizes external light, an auxiliary illumination unit is provided in order to enable the device to be used in dark places. As such an illumination unit for a liquid crystal display device, a spread illuminating apparatus including a light guide plate and a light source disposed to the side of the light guide plate as the main constituent elements is widely used in combination with a liquid crystal display device, because such a spread illuminating apparatus has an advantage in making it thin easily. Further, due to recent enhancements in the performance of white light-emitting diodes (LEDs), spread illuminating apparatuses utilizing white LEDs as a light source are now regularly used in order to achieve further reductions in the size, thickness, and power consumption of spread illuminating apparatuses.

As will be explained later (refer to FIG. 10), such a spread illuminating apparatus includes a light source; a light guide plate that receives light from the light source and emits it, one surface of a pair of opposing principal surfaces of the light guide plate being configured as a light emitting surface; an optical sheet that is disposed on the emitting surface side of the light guide plate and appropriately diffuses light emitted from the light guide plate; and a frame that accommodates these constituent elements.

The thickness of each constituent element has been required to be reduced in order to support the reduced thickness of the spread illuminating apparatus. Due to this requirement, there are cases in which a so-called injection compression molding method is used to mold the light guide plate. In such a method, a light guide plate of a predetermined shape is molded by slightly expanding a cavity of a metallic mold while filling a molten resin therein and then clamping the metallic mold after filling the molten resin so as to narrow the cavity and thereby compress the molten resin.

Figure 11:
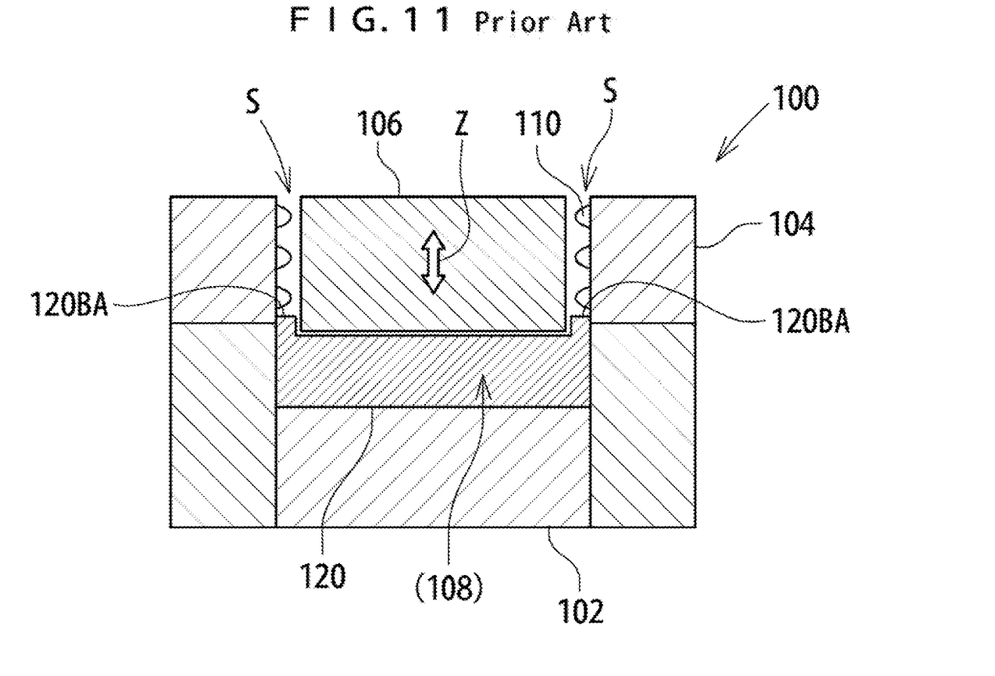
FIG. 11 is a schematic sectional view illustrating a metallic mold for molding a conventional light guide plate by an injection compression molding method as well as a cross section of this light guide plate.

FIG. 11 illustrates a metallic mold 100 used in the above-described injection compression molding method. The metallic mold 100 includes a fixed mold 102, a movable frame 104 that can separate from/move toward the fixed mold 102 in an opening/closing direction Z of the metallic mold, and a movable mold 106 that can move relatively in the opening/closing direction Z of the metallic mold relative to the movable frame 104. A cavity 108 is constituted by the fixed mold 102 and the movable mold 106. A light guide plate 120 is formed by molding and solidifying a molten resin that has been filled into the cavity 108 into the shape of the cavity 108.

In the structure of the above-described metallic mold, it is necessary to ensure good slidability between the movable frame 104 and the movable mold 106 and to prevent the occurrence of trouble with the metallic mold such as scraping between the movable frame 104 and the movable mold 106 when they are moving relative to each other. Therefore, a slight gap S is provided between the movable frame 104 and the movable mold 106. Further, in the illustrated example, rollers 110 are rotatably disposed in the gap S between the movable frame 104 and the movable mold 106.

SUMMARY OF THE INVENTION

When using an injection molding machine including the above-described metallic mold 100 to mold the light guide plate 120, molten resin may penetrate from the cavity 108 into the gap S between the movable frame 104 and the movable mold 106, leading to the occurrence of a slight burr (regularly or irregularly shaped protrusion) 120BA that projects in a thickness direction of the light guide plate 120 along the outer shape of the light guide plate 120. The projecting height of the burr 120BA can be suppressed to, for example, 30 μm or less by narrowing the gap S or optimizing the injection molding conditions when molding the light guide plate 120. However, given the recent requirements for further reductions in the thickness of the light guide plate (to, for example, 0.3 mm or less), it has been reported that even such a burr 120BA that has been suppressed as described above may become a factor leading to defects.

Figure 12:
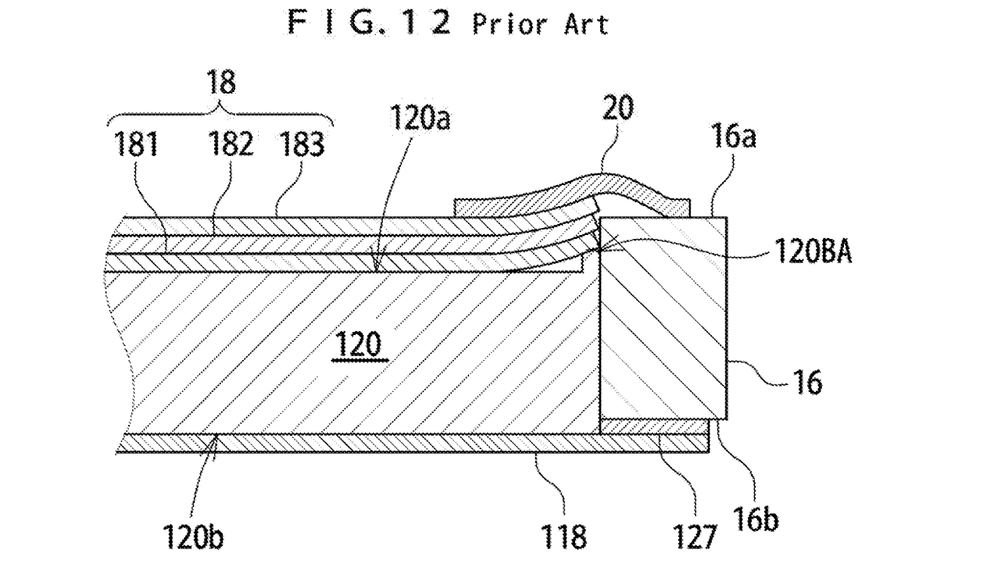
FIG. 12 is a sectional view of the essential parts of a conventional spread illuminating apparatus having the light guide plate of FIG. 11.

As such defects, as shown in FIG. 12, when the spread illuminating apparatus 10 is assembled upon stacking a plurality of optical sheets 181, 182, and 183 on an emitting surface 120a of the light guide plate 120 (plural optical sheets are exemplified here, but only one piece may be applied instead) and accommodating them in the frame 16, there have been cases in which the optical sheets 18 ride up on the burr 120BA, leading to a loss of dimensional accuracy in the thickness direction of the spread illuminating apparatus 10.

There have been cases in which a light blocking member 20 that is disposed spanning across an outer edge of the optical sheet 183 and an upper surface 16a of the housing frame 16 is pushed up at the outer edge of the optical sheet 183 due to a deviation between the height position of the outer edge of the optical sheet 183 and the height position of the upper surface 16a of the housing frame 16. This reduces the contact surface area of the light blocking member 20 with the upper surface 16a of the housing frame 16, which in turn leads to insufficient adherence of the light blocking member 20. If the adherence of the light blocking member 20 on the housing frame 16 is insufficient, defects may occur in which the optical sheet 18 cannot be reliably fixed to the housing frame 16 and the liquid crystal display panel cannot be stably fixed onto the light blocking member 20.

In addition, there are cases in which a deviation may occur in the position of a double-sided tape (BST) 127 for fixing a reflective sheet 118, which is disposed on a principal surface 120b side opposing the emitting surface 120a of the light guide plate 120, to a lower surface 16b of the housing frame 16, leading to the reflecting sheet 118 being adhered in a state in which it is sticking out from the principal surface 120b of the light guide plate. In such a case, the overall thickness increases by the thickness amount of the BST 127, and deviations between the height position of the outer edge of the optical sheet 183 and the height position of the upper surface 16a of the housing frame 16 can occur, similarly to the deviations caused by the above-described burr 120BA.

These defects become more prominent due to narrowing of the adherence surface area between the optical sheets 18 and the housing frame 16 that follows further thickness reductions and required frame edge narrowing (narrowing of the width of the housing frame 16 and the light blocking member 20) in spread illuminating apparatuses.

The present invention was created in consideration of the above-described problems, and an object thereof is to provide a spread illuminating apparatus that enables further narrowing of the frame edge of the spread illuminating apparatus and achieves high dimensional accuracy and good assemblability.

(Embodiments of the Invention)

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention can also include structures in which a portion of the components in the aspects below is substituted or deleted, or another component is added upon referring to the best modes for carrying out the invention.

A spread illuminating apparatus in a first aspect including: a light guide plate in which one principal surface among a pair of opposing principal surfaces is a light emitting surface; at least one piece of optical sheet that is stacked on the emitting surface; a light source disposed opposing an incident light surface of the light guide plate; and a frame for accommodating the light guide plate, wherein on the principal surfaces of the light guide plate, a protruding part that projects in a thickness direction and a recessed part that is recessed in the thickness direction are provided so as to form a pair along an end surface of the light guide plate.

At all elements in the present invention, the optical sheet should have one piece or more. However, the following explanation is basically given in a case that there are plural optical sheets for easily revealing the intention of the present invention. Of course, this does not mean to exclude an embodiment where there is only one optical sheet applied.

With this structure, on the principal surfaces of the light guide plate, a protruding part that projects in the thickness direction and a recessed part that is recessed in the thickness direction are shaped so as to form a pair along an end surface of the light guide plate. Thereby, the thickness of a portion along the end surface of the principal surface of the light guide plate is intentionally determined by the protruding part and the recessed part. In other words, by determining the thickness of the portion along the end surface of the principal surface of the light guide plate by the protruding part and the recessed part, this thickness falls within an appropriate dimension range. Also, as will be explained later, even if the light guide plate is molded by an injection compression molding method, the protruding part is constituted by effectively utilizing a burr formed so as to project from the principal surface along the end surface of the light guide plate, and the thickness of the portion along the end surface of the principal surface of the light guide plate falls within an appropriate dimension range in relation to the recessed part that forms a pair with the protruding part. Therefore, the edges of the plurality of optical sheets that are stacked on the emitting surface of the light guide plate do not rise up in the stacking direction of the optical sheets due to the thickness of the portion along the end surface of the light guide plate. Further, even if the optical sheets do rise up slightly, the amount that the optical sheets rise up is suppressed, and thus the negative effects caused by the burr are lessened.

In addition, the thickness of the light guide plate decreases near the end of the light guide plate due to the recessed part provided along the end surface of the light guide plate. Thus, the amount of light that leaks from the end surface of the light guide plate is reduced, and the amount of light emitted from the emitting surface is increased.

The protruding part and the recessed part can be provided, for example, across a portion of or the entire length of one or all of the end surfaces extending in a direction that intersects the end surface serving as the incident light surface of the light guide plate and the end surface opposing the end surface serving as the incident light surface of the light guide plate.

Since the thickness dimension of the light guide plate is small, warping can easily occur in a state in which the outer shape of the light guide plate is not constrained. However, the dimensions of the protruding part and the recessed part are specified based on the original shape in which any warping has been corrected such as in the state in which the light guide plate is incorporated in the spread illuminating apparatus (in the case of injection molding with a metallic mold, the shape in a state in which the light guide plate has been molded within the cavity of the metallic mold).

The spread illuminating apparatus in the first aspect, further including a light blocking member that defines an effective area of the emitting surface of the light guide plate, wherein the light blocking member is fixed spanning across outer edges of the optical sheets and an upper surface of the frame.

With this structure, by providing a light blocking member that defines an effective area of the emitting surface of the light guide plate, the effective area is clarified. Further, by fixing the light blocking member so that it spans across the outer edges of the optical sheets and an upper surface of the frame, the optical sheets are fixed in the housing frame via the light blocking member. In addition, the thickness of the portion along the end surface of the principal surface of the light guide plate is intentionally determined by the protruding part and the recessed part formed along the end surface of the light guide plate on the principal surface of the light guide plate. Therefore, dimensional accuracy in the thickness direction of the portion along the end surface of the principal surface of the light guide plate is ensured, and the light blocking member that is disposed spanning across the outer edges of the optical sheets and the upper surface of the housing frame is not pushed up in a state in which the contact surface area between the light blocking member and the upper surface of the housing frame is reduced at the outer edges of the optical sheets. Therefore, the light blocking member can be reliably fixed to the upper surface of the housing frame.

The spread illuminating apparatus in the first aspect, in which the protruding part and the recessed part are provided along an end surface of the light guide plate that extends in a direction that intersects an end surface serving as the incident light surface of the light guide plate.

With this structure, by providing the protruding part and the recessed part along the end surface of the light guide plate that extends in a direction that intersects the end surface serving as the incident light surface of the light guide plate, at this end surface, the edges of the plurality of optical sheets stacked on the emitting surface of the light guide plate can be prevented from rising up in the stacking direction of the optical sheets due to the thickness of the portion along the end surface that extends in a direction that intersects the end surface serving as the incident light surface of the light guide plate. Further, in the case that the light blocking member disposed spanning across the outer edges of the optical sheets and the upper surface of the frame is provided, reductions in the contact surface area between the light blocking member and the upper surface of the housing frame, which lead to insufficient adherence of the light blocking member, caused by the rising up of the optical sheets in the stacking direction thereof at the outer edges of the optical sheets can be avoided. Therefore, even if the frame edge is further narrowed (the width of the housing frame and the light blocking member is further narrowed), the necessary contact surface area between the light blocking member and the housing frame is secured at the end surface that extends in a direction that intersects the end surface serving as the incident light surface of the light guide plate.

The spread illuminating apparatus in the first aspect, in which, using a bottom surface that lies at a maximum depth of the recessed part as a reference, a maximum height of the protruding part is formed to match a maximum depth of the recessed part or is formed to be less than the maximum depth of the recessed part.

With this structure, with regard to the protruding part and the recessed part that are provided on the principal surface of the light guide plate so as to form a pair, the maximum height of the protruding part is determined using a bottom surface part which is the maximum depth of the recessed part as a reference. In this case, the maximum height of the protruding part is formed to be the same as the maximum depth of the recessed part, or is formed to be less than the maximum depth of the recessed part. In other words, the maximum height of the protruding part is formed to be equal to or less than the maximum depth of the recessed part. With this structure, the maximum height of the protruding part, which determines the thickness dimension of the portion near the end surface of the light guide plate, is equal to or less than the thickness dimension of a center in a plan view of the pair of opposing principal surfaces of the light guide plate. Therefore, the edges of the plurality of optical sheets that are stacked on the emitting surface of the light guide plate do not ride up onto the protruding part and are not pushed up by the protruding part.

The spread illuminating apparatus in the first aspect, in which a dimension of the protruding part and a dimension of the recessed part in a direction from the end surface at which the protruding part and the recessed part are provided toward a center in a plan view of the pair of opposing principal surfaces of the light guide plate are formed such that the dimension of the recessed part is greater than the dimension of the protruding part.

With this structure, the dimension of the recessed part in a direction from the end surface at which the protruding part is provided toward the center in a plan view of the pair of opposing principal surfaces of the light guide plate is greater than the dimension of the protruding part. In other words, the range occupied by the recessed part on the principal surface is wider than the range occupied by the protruding part. Thereby, the plate thickness of the light guide plate decreases gently in a direction from the center toward the end surface at which the protruding part is provided, and the occurrence of bright lines on the emitting surface of the light guide plate caused by decreases in the plate thickness in the recessed part can be avoided.

The spread illuminating apparatus in the first aspect, in which the recessed part is formed so as to gradually become deeper beginning at the center in a plan view of the pair of opposing principal surfaces of the light guide plate toward the end surface at which the protruding part is provided, the recessed part reaching a maximum depth at or near the end surface.

With this structure, the recessed part is formed over a wide range beginning from the center in a plan view of the pair of opposing principal surfaces of the light guide plate so that it reaches a maximum depth at or near the end surface at which the protruding part is formed. In other words, by forming the recessed part over a wide range of the principal surface so that the thickness thereof decreases gently, light from the light source that has entered into the incident light surface of the light guide plate is refracted or reflected upon being subjected to deflection over a wide range by the recessed part shape formed on the pair of opposing principal surfaces, and thus the proportion of this light that becomes leaked light from the end surface of the light guide plate decreases.

The spread illuminating apparatus in the first aspect, in which a plurality of convex strip-shaped parts extending from the end surface serving as the incident light surface of the light guide plate toward an opposing end surface are provided on one principal surface among the pair of opposing principal surfaces of the light guide plate.

With this structure, light from the light source that has entered into the incident light surface of the light guide plate is refracted or reflected upon being subjected to deflection by a plurality of convex strip-shaped parts that are provided on one principal surface among the pair of opposing principal surfaces of the light guide plate and extend from the end surface side serving as the incident light surface of the light guide plate toward the opposing end surface, and then the light is diffused irregularly in a direction parallel to the incident light surface. This facilitates the uniformity of light that is emitted from the emitting surface of the light guide plate. Further, by individually adjusting the height of each of the plurality of convex strip-shaped parts, the thickness of the light guide plate differs, and thereby the recessed part and the protruding part are formed as the overall shape of the light guide plate. For example, by configuring the height of a convex-shaped part that passes through the center in a plan view of the pair of opposing principal surfaces of the light guide plate to be the highest and then gradually decreasing the height of adjacent convex-shaped parts from the center toward the end surface of the light guide plate, the recessed part having the structure described in (6) above is formed macroscopically. Further, by increasing the height of the convex-shaped parts that pass near the end of the light guide plate, the protruding part that forms a pair with the recessed part is formed macroscopically.

In the case that the light guide plate is injection molded, grooves are cut in the surface of the metallic die used for injection molding with a cutting tool (bite), and these grooves are transferred to the molten resin that is filled into the cavity of the metallic mold. Therefore, the step for processing the metallic die in order to form the recessed part and the protruding part becomes consolidated into the step for cutting the grooves with the cutting tool.

The spread illuminating apparatus in the first aspect, in which both the protruding part and the recessed part are provided on one principal surface among the pair of opposing principal surfaces of the light guide plate such that the recessed part is positioned on the inside of the protruding part in a plan view of the principal surface.

With this structure, both the protruding part and the recessed part are provided on one principal surface among the pair of opposing principal surfaces of the light guide plate such that the recessed part is positioned on the inside of the protruding part.

The spread illuminating apparatus in the first aspect, in which one or both of the protruding part and the recessed part is/are provided on the principal surface side serving as the emitting surface of the light guide plate or on the other principal surface side.

With this structure, the spread illuminating apparatus is not limited to an embodiment in which both the protruding part and the recessed part are provided on the principal surface serving as the emitting surface of the light guide plate, and an embodiment in which both the protruding part and the recessed part are provided on the other principal surface as well as an embodiment in which the protruding part is provided on one among the pair of principal surfaces and the recessed part is provided on the other principal surface are included in the present invention. More specifically, the present invention includes an embodiment in which the protruding part is provided on the principal surface serving as the emitting surface and the recessed part is provided on the other principal surface, and an opposite embodiment in which the recessed part is provided on the principal surface serving as the emitting surface and the protruding part is provided on the other principal surface. In these embodiments, since the protruding part and the recessed part are provided to form a pair along the end surface of the light guide plate, in the state in which the light guide plate is incorporated into the spread illuminating apparatus, the protruding part formed on one of the principal surfaces elastically deforms with the recessed part provided on the other principal surface as a deformation margin. Thereby, the light guide plate is corrected in a direction in which it becomes flat so that the protruding amount of the protruding part is reduced.

The spread illuminating apparatus in the first aspect, in which the light guide plate is molded by an injection compression molding method.

With this structure, the light guide plate is molded by an injection compression molding method, and the protruding part and the recessed part are formed by filling a molten resin into the cavity constituted by the fixed mold and the movable mold of the metallic mold for injection compression molding and solidifying the molten resin in the shape transferred to the molten resin by the cavity. Specifically, a concave-shaped part for molding the protruding part and a convex-shaped part for molding the recessed part are formed on a molding surface that constitutes the cavity of either one or both of the fixed mold and the movable mold. The cavity of the metallic mold is slightly expanded while filling the molten resin therein, and then the metallic mold is clamped after filling the molten resin so as to narrow the cavity and thereby compress the molten resin. Thus, a light guide plate having a protruding part and a recessed part on the principal surfaces thereof is obtained. The spread illuminating apparatus according to the present invention having a light guide plate that has been molded as described above achieves effects described hereinabove.

A spread illuminating apparatus having a light guide plate in which one principal surface among a pair of opposing principal surfaces is a light emitting surface, a plurality of optical sheets that are stacked on the emitting surface, a light source disposed opposing an incident light surface of the light guide plate, and a frame for accommodating the above-mentioned constituent elements, in which the light guide plate is molded by an injection compression molding method, and a notch is provided on an outer edge of at least one of the optical sheets toward the center in a plan view of the optical sheets.

With this structure, by molding the light guide plate by an injection compression molding method, a burr that projects in the thickness direction of the light guide plate is formed along the outer shape of the light guide plate. This burr is avoided by a notch provided on an outer edge of at least one of the optical sheets toward the center in a plan view of the optical sheets. Therefore, the occurrence of deviations between the height position of the outer edges of the plurality of stacked optical sheets and the height position of the upper surface of the housing frame caused by the optical sheets riding up onto the burr can be avoided.

For example, if a notch is provided in the optical sheet of the first layer closest to the light guide plate among the plurality of stacked optical sheets, this optical sheet that is closest to the light guide plate will not ride up onto the burr, and the outer edges of the other stacked optical sheets of the second layer and above will maintain their flat shape. Further, even if the optical sheets of the second layer and above rise up slightly because the projecting height of the burr from the principal surface of the light guide plate exceeds the thickness of a single optical sheet, the amount that the optical sheets rise up is suppressed, and thus negative effects are lessened. In addition, for example, if a notch is provided in the optical sheet of the second layer, the optical sheet of the first layer may ride up onto the burr and rise up, but the portion at which the optical sheet of the first layer has risen up is avoided by the notch of the optical sheet of the second layer, and thus the outer edge of the optical sheet of the second layer does not rise up or the amount by which it rises up is suppressed.

Depending on the projecting amount of the burr, the projecting part of the burr can be sufficiently neutralized across all of the plurality of stacked optical sheets by providing a notch at the same place in two or more of the optical sheets.

The spread illuminating apparatus in the first aspect, in which a notch is provided in at least two of the optical sheets, and the notch formed in one of the optical sheets and the notch formed in the other optical sheet are provided at locations that do not overlap each other in a plan view of the optical sheets.

With this structure, at the locations at which the notches are provided in the optical sheets, the effects of the burr at the edges of the optical sheets caused by the outer edges of the optical sheets retreating toward the center in a plan view of the optical sheets are reliably avoided. In other words, by providing the notch formed in one of the optical sheets and the notch formed in the other optical sheet at locations that do not overlap each other in a plan view of the optical sheets, the burr or the rising up of the optical sheets due to the burr is reliably avoided by one of the notches in the optical sheets regardless of where the burr exists.

The spread illuminating apparatus in the first aspect, in which a notch is provided on an outer edge of at least one of the optical sheets toward the center in a plan view of the optical sheets.

With this structure, the effects corresponding to the spread illuminating apparatus of the above are achieved in the spread illuminating apparatus.

The spread illuminating apparatus in the first aspect, in which a notch is provided in at least two of the optical sheets, and the notch formed in one of the optical sheets and the notch formed in the other optical sheet are provided at locations that do not overlap each other in a plan view of the optical sheets.

With this structure, the effects corresponding to the spread illuminating apparatus of the above are achieved in the spread illuminating apparatus.

With the above structures, the frame edge of the spread illuminating apparatus can be further narrowed, and high dimensional accuracy and good assemblability can be achieved.

DETAILED DESCRIPTION

Embodiments of the present invention will now be explained below referring to the drawings. Portions that are identical to or correspond to portions in the conventional technology will be assigned with the same reference sign for convenience, and detailed explanations thereof will be omitted. Further, the "up" and "down" directions in the following explanations indicate the up-down direction in a state in which the spread illuminating apparatus is laid flat.

Figure 1:
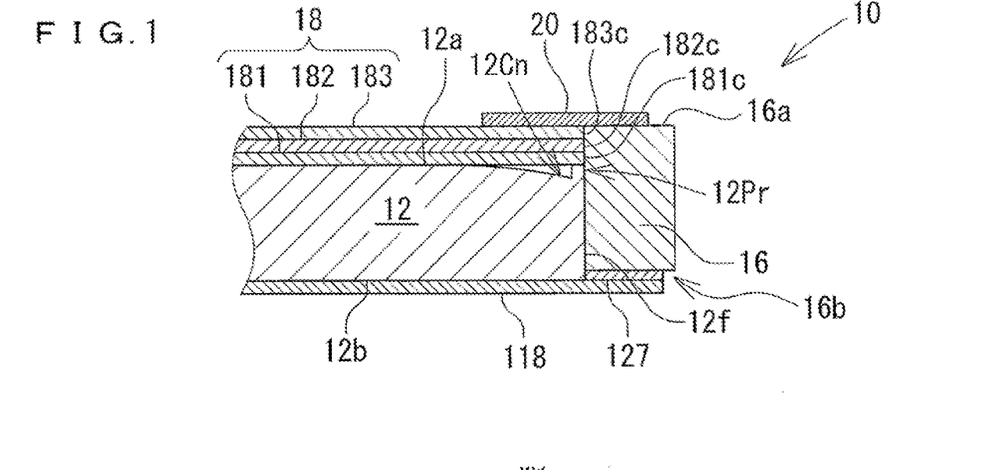
FIG. 1 is a sectional view of the essential parts of a spread illuminating apparatus according to an embodiment of the present invention.
Figure 10:
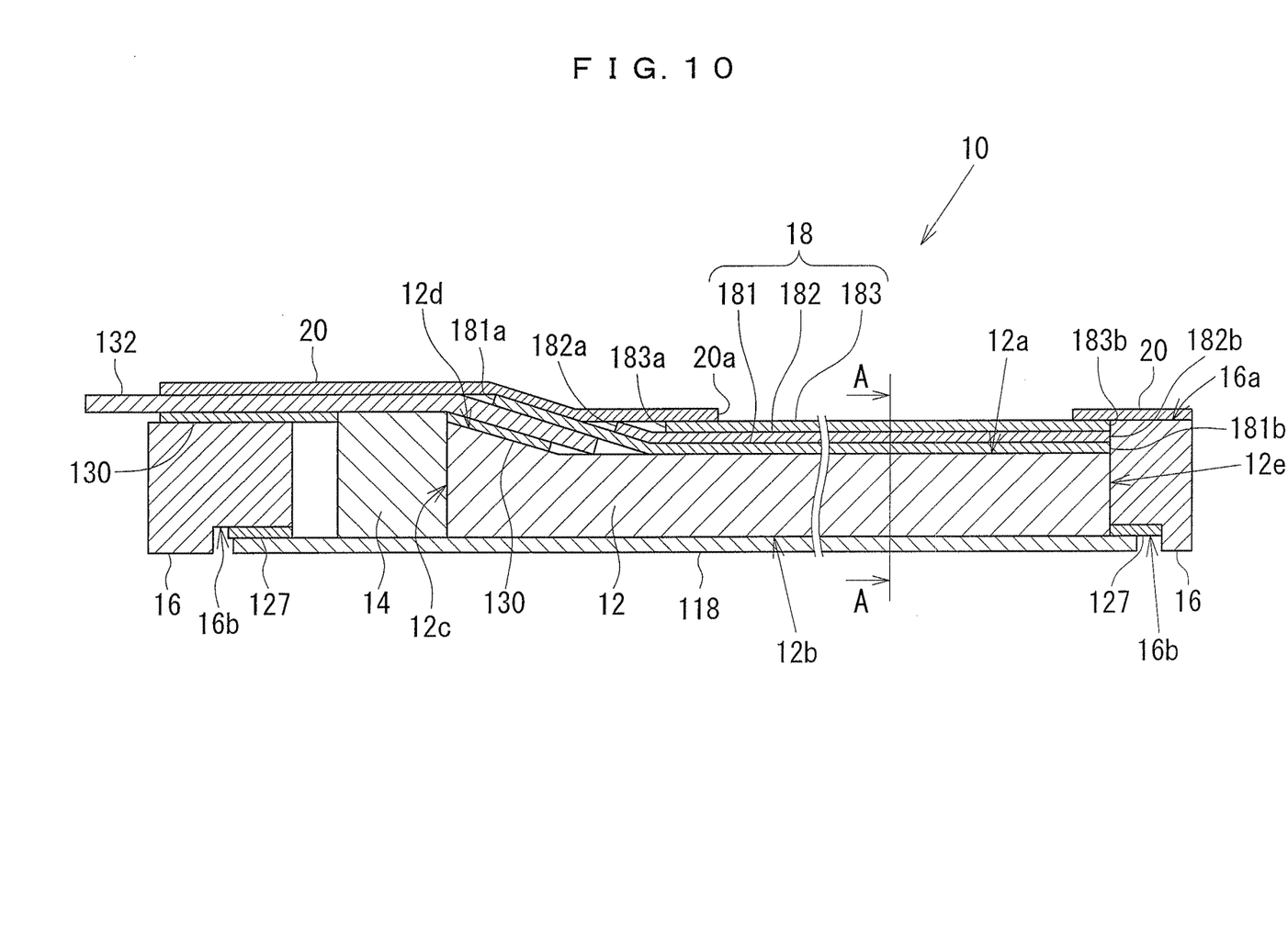
FIG. 10 is a sectional view illustrating an overall structure of a spread illuminating apparatus according to an embodiment of the present invention.

FIGS. 1 and 10 schematically illustrate the structure of a spread illuminating apparatus 10 according to an embodiment of the present invention. FIG. 1 also partially illustrates a sectional view along line A-A in FIG. 10. The spread illuminating apparatus 10 includes a light guide plate 12 in which one principal surface 12a among a pair of opposing principal surfaces 12a and 12b is a light emitting surface, a plurality of optical sheets 18 that are stacked on the emitting surface 12a, a light blocking member 20 that defines an effective area of the emitting surface 12a, an LED (a point light source) that serves as a light source 14 disposed opposing an incident light surface 12c of the light guide plate 12, and a frame 16 made of for example, a synthetic resin for accommodating the above-mentioned constituent elements. The "effective area" of the emitting surface 12a defined by the light blocking member 20 is an area excluding a "non-effective area", which is an area that unavoidably exists near the edge of the emitting surface 12a of the light guide plate 12 in which the uniformity of emitted light decreases or the like due to the influence of reflection of light at the side end surfaces of the light guide plate 12 or the like.

In the spread illuminating apparatus according to this embodiment, the non-effective area is covered by the light blocking member 20 that is, for example, frame-shaped (frame edge-shaped) in a plan view of the emitting surface 12a of the light guide plate 12, so that the light emitted from the effective area is effectively utilized to the maximum degree. The light blocking member 20 is in the form of, for example, an adhesive tape in which an adhesive layer is formed on one or both sides, and is adhered and fixed spanning across the outer edges of the optical sheets 18 and an upper surface 16a of the frame 16.

In FIGS. 1 and 10, a lower surface of the frame indicated by the reference sign 16b is an attachment seat of a reflective sheet 118, and the reflective sheet 118 is fixed to this attachment seat using a double-sided tape (BST) 127.

In the present embodiment, the optical sheets 18 include a first sheet 181 that is stacked in the first layer counting from the emitting surface 12a of the light guide plate 12, a second sheet 182 that is stacked on the first sheet 181, and a third sheet 183 that is stacked on the second sheet 182. As one example, the first sheet 181 is a diffusing sheet, the second sheet 182 is a lower prism sheet, and the third sheet 183 is an upper prism sheet. These optical sheets 181, 182, and 183 are positioned relative to the frame 16 by abutting edges 181b, 182b, and 183b on the side of a surface 12e that opposes the incident light surface 12c of the light guide plate 12 to the inner peripheral surface of the frame 16. In the illustrated example, the positions of the edges 181a, 182a, and 183a on the side of the incident light surface 12c of the light guide plate 12 are formed to be spaced further from the incident light surface 12c of the light guide plate 12 the higher up the optical sheet is in the stacking order of the optical sheets 18 counting from the emitting surface 12a of the light guide plate 12.

Meanwhile, the light blocking member 20 extends from the incident light surface 12c side of the light guide plate 12 so as to cover the vicinity of the edges 181a, 182a, and 183a of the optical sheets 181, 182, and 183 on the incident light surface 12c side of the light guide plate 12. The light blocking member 20 is fixed to the vicinity of the edges 181a, 182a, and 183a of the optical sheets 181, 182, and 183 on the incident light surface 12c side of the light guide plate 12.

In a range from the incident light surface 12c over a predetermined width toward the center of the emitting surface 12a of the light guide plate 12, an inclined surface 12d that decreases the thickness between the pair of opposing principal surfaces toward the center of the light guide plate is formed. A range toward the center from the inclined surface 12d has a fixed thickness.

Among the optical sheets 181, 182, and 183, a range of a predetermined width from the edges 181a and 182a of the first sheet 181 and the second sheet 182 on the incident light surface 12c side of the light guide plate 12 is inclined following the inclined surface 12d formed on the emitting surface 12a of the light guide plate 12.

In the example shown in FIG. 10, a wiring board 132 of the light source 14 is inclined along the inclined surface 12d of the light guide plate 12, and is fixed to the inclined surface 12d by a double-sided tape 130. Since the first sheet 181 is stacked on the wiring board 132, a range of the first sheet 181 of a predetermined width from the edge 181a on the incident light surface 12c side of the light guide plate 12 is inclined following the inclined surface 12d of the light guide plate 12. Further, since the second sheet 182 is stacked on the inclined portion in the range of the first sheet 181 of a predetermined width from the edge 181a on the incident light surface 12c side of the light guide plate 12, a range of the second sheet 182 of a predetermined width from the edge 182a on the incident light surface 12c side of the light guide plate 12 is also inclined following the inclined surface 12d of the light guide plate 12. The "ranges of a predetermined width" mentioned above are what is determined by the positional relationships between the inclined surface 12d of the light guide plate 12 and the edges 181a and 182a of the sheets 181 and 182.

In the present embodiment, as shown in FIG. 1, a protruding part 12Pr that projects in the thickness direction and a recessed part 12Cn that is recessed in the thickness direction are provided so as to form a pair on the emitting surface 12a of the light guide plate 12 along an end surface 12f of the light guide plate 12 (the end surface 12f in FIG. 1 is an end surface that extends in a direction that intersects the incident light surface 12c of the light guide plate 12 (refer to FIG. 10)).

The protruding part 12Pr and the recessed part 12Cn are provided as necessary on one or all of the end surfaces 12f that extend in a direction that intersects the incident light surface 12c (refer to FIG. 10) of the light guide plate 12 and an end surface 12e that opposes the incident light surface 12c as shown in FIG. 1. In the present embodiment, the light guide plate 12 is molded by an injection compression molding method, and thus the protruding part 12Pr and the recessed part 12Cn are provided on a portion of or across the entire lengths of the end surfaces 12f and 12e.

The protruding part 12Pr and the recessed part 12Cn are not provided on the incident light surface 12c of the light guide plate 12 because the incident light surface 12c is not as constrained regarding the need to narrow the frame edge as the other end surfaces, and providing these parts on the incident light surface 12c may have a negative effect on the bonding efficiency between the light source 14 and the light guide plate 12.

Figure 2:
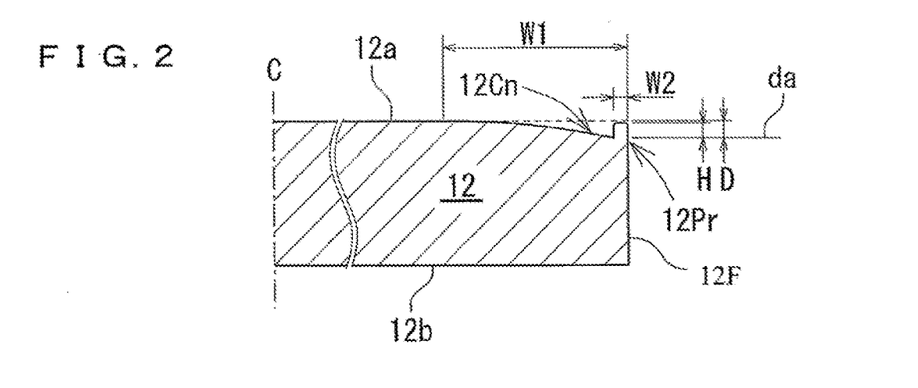
FIG. 2 is a partial sectional view illustrating the light guide plate of the spread illuminating apparatus shown in FIG. 1.

As shown in FIG. 2, using a bottom surface that lies at a maximum depth of the recessed part 12Cn of the light guide plate 12 as a reference da, a maximum height H of the protruding part 12Pr is formed to match a maximum depth D of the recessed part 12Cn (H=D), or is formed to be less than the maximum depth D of the recessed part 12Cn (H<D). As will be explained later, in the example shown in FIG. 2, the thickness dimension of an area on which the protruding part 12Pr is provided is smaller than a thickness dimension (distance between the opposing pair of principal surfaces 12a and 12b) at a center line C in a plan view of the principal surface 12a of the light guide plate 12.

A dimension W1 and a dimension W2 of the protruding part 12Pr and the recessed part 12Cn in a direction from the end surface 12f at which the protruding part 12Pr and the recessed part 12Cn are provided toward the center (center line C) of the light guide plate 12 in a plan view of the emitting surface 12a of the light guide plate 12 are formed such that the dimension of the recessed part 12Cn (W1-W2) is greater than the dimension W2 of the protruding part 12Pr.

Figure 4:
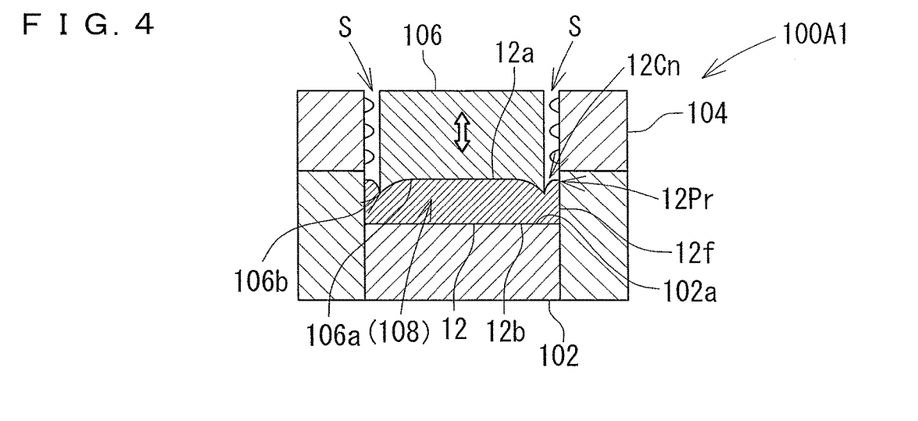
FIG. 4 is a schematic sectional view illustrating a metallic mold for molding the light guide plate shown in FIG. 2 by an injection compression molding method as well as a cross section of this light guide plate.

The light guide plate 12 according to the example shown in FIGS. 1 and 2 is manufactured by injection compression molding using a metallic mold 100A1 shown in FIG. 4. The difference between this metallic mold 100A1 and the conventional metallic mold 100 (FIG. 11) is as follows: a protruding part 106b for molding the recessed part 12Cn of the light guide plate 12 is formed on a molding surface 106a of the movable mold 106 that constitutes the cavity 108. In the example of FIG. 4, the protruding part 106b is constituted to project downward (toward the molding surface 102a side of the fixed mold 102) moving toward the ends (the ends in the left-right direction in FIG. 4) in a region on the end sides of the molding surface 106a.

By molding the light guide plate 12 with this metallic mold 100A1, the shape of the protruding part 106b is transferred to the molten resin filled in the cavity 108, and thereby the recessed part 12Cn shown in FIGS. 1, 2, and 4 is formed. Meanwhile, molten resin from the cavity 108 penetrates into the gap S between the movable frame 104 and the movable mold 106, and thereby a burr (regularly or irregularly shaped protrusion) projecting in the thickness direction of the light guide plate 12 along the outer shape of the light guide plate 12 becomes the protruding part 12Pr. At this time, the starting point of the gap S on the cavity 108 side is the distal end of the protruding part 106b. Thus, if the penetration depth of molten resin into the gap S from the cavity 108 is the same as that in the conventional metallic mold 100 (which can be controlled by the viscosity of the molten resin, the temperature of metallic mold, etc.), the projecting height of the protruding part 12Pr will be lower than the conventional burr 120BA, and thus the above-mentioned relationship H<D (refer to FIG. 2) will be established.

In the example of FIG. 4, converse to that explained above, the emitting surface 12a of the light guide plate 12 may be molded on the molding surface 102a side of the fixed mold 102 and the other principal surface 12b may be molded on the molding surface 106a side of the movable mold 106, so that the protruding part 12Pr and the recessed part 12Cn are molded on the principal surface 12b opposing the emitting surface 12a.

In the example of FIGS. 1 and 2, the width dimension (W1-W2)of the recessed part 12Cn in a plan view thereof is provided in a range that does not extend from the end surface 12f to the center line C. However, as shown in FIG. 5, the recessed part 12Cn may be formed so that it gradually becomes deeper beginning at the center in a plan view of the emitting surface 12a of the light guide plate 12 toward the end surface at which the protruding part 12Pr is provided, the recessed part 12Cn reaching a maximum depth D at or near the end surface 12f.

Figure 5:
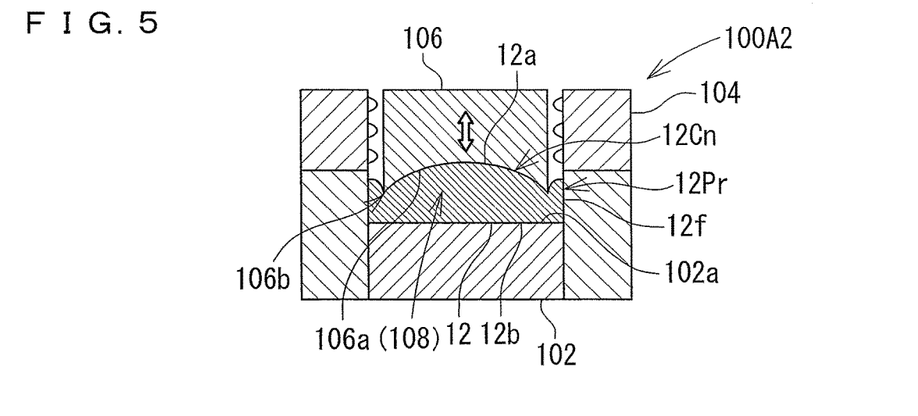
FIG. 5 is a schematic sectional view showing an application example of FIG. 4.

The light guide plate 12 in this case is injection compression molded using a metallic mold 100A2 shown in FIG. 5. The difference between this metallic mold 100A2 and the metallic mold 100A1 shown in FIG. 4 is as follows: the protruding part 106b for molding the recessed part 12Cn of the light guide plate 12 is formed on the molding surface 106a of the movable mold 106 across a wider range beginning at the center in a plan view of the emitting surface 12a of the light guide plate 12. In the example of FIG. 5, the protruding part 106b is constituted to project downward (toward the molding surface 102a side of the fixed mold 102) so as to create a continuous curved surface from the center of the molding surface 106a to the ends (the ends in the left-right direction in FIG. 5) of the molding surface 106a.

By molding the light guide plate 12 with this metallic mold 100A2, the shape of the protruding part 106b is transferred to the molten resin filled in the cavity 108, and thereby the recessed part 12Cn shown in FIG. 5 is formed. Meanwhile, the protruding part 12Pr is the same as that in the example of FIG. 4.

In the example of FIGS. 1 and 2, both the protruding part 12Pr and the recessed part 12Cn are provided on one principal surface, i.e. the emitting surface 12a, of the pair of opposing principal surfaces of the light guide plate 12, and the recessed part 12Cn is provided on the inside of the protruding part 12Pr in a plan view of the emitting surface 12a. However, the present invention is not limited to such an embodiment.

Figure 3A:
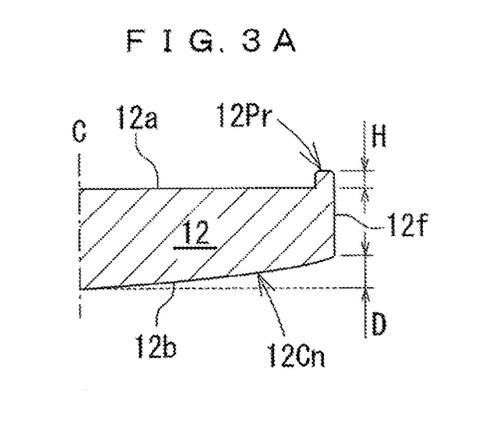
FIGS. 3A and 3B are both partial sectional views illustrating application examples of the light guide plate shown in FIG. 2.
Figure 3B:
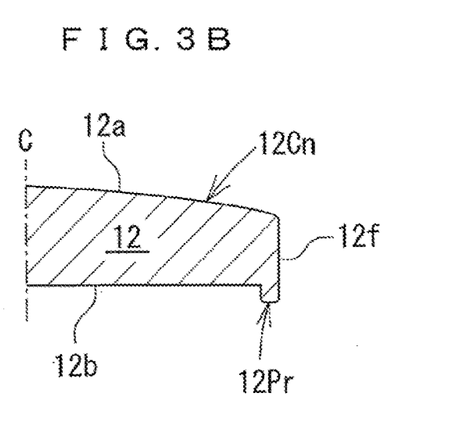

The present invention also includes, for example, an embodiment as shown in FIG. 3A in which the protruding part 12Pr is provided on the emitting surface 12a and the recessed part 12Cn is provided on the other principal surface 12b, and conversely an embodiment as shown in FIG. 3B in which the recessed part 12Cn is provided on the emitting surface 12a and the protruding part 12Pr is provided on the other principal surface 12b.

Figure 6:
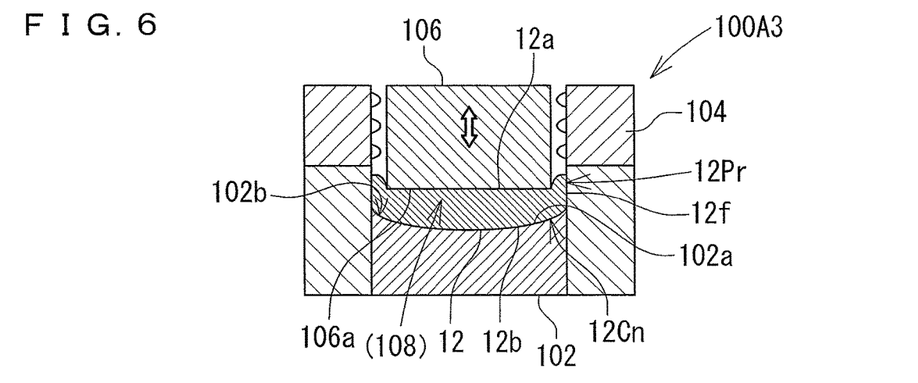
FIG. 6 is a schematic sectional view illustrating a metallic mold for molding the light guide plate shown in FIG. 3 by an injection compression molding method as well as a cross section of this light guide plate.

The light guide plate 12 according to the example of FIG. 3A is injection compression molded using a metallic mold 100A3 shown in FIG. 6. The difference between this metallic mold 100A3 and the metallic mold 100A1 shown in FIG. 4 is as follows: a curved surface 102b for forming the recessed part 12Cn of the light guide plate 12 is formed on a molding surface 102a of the fixed mold 102 that constitutes the cavity 108. In the example of FIG. 6, the curved surface 102b is constituted to curve upwards (toward the molding surface 106a side of the movable mold 106) moving toward the ends so as to create a continuous curved surface from the center of the molding surface 102a to the ends of the molding surface 102a (the ends in the left-right direction of FIG. 6).

By molding the light guide plate 12 with this metallic mold 100A3, the shape of the curved surface 120b is transferred to the molten resin filled in the cavity 108, and thereby the recessed part 12Cn shown in FIGS. 3A and 6 is formed. Meanwhile, the protruding part 12Pr is the same as the burr 120BA of the conventional example (FIG. 11), but the shape of the curved surface 102b is set so that the above-mentioned relationship H<D is established.

The light guide plate 12 according to the example of FIG. 3B can be manufactured by molding the emitting surface 12a of the light guide plate 12 on the molding surface 102a side of the fixed mold 102 and molding the other principal surface 12b on the molding surface 106a side of the movable mold 106.

Figure 13:
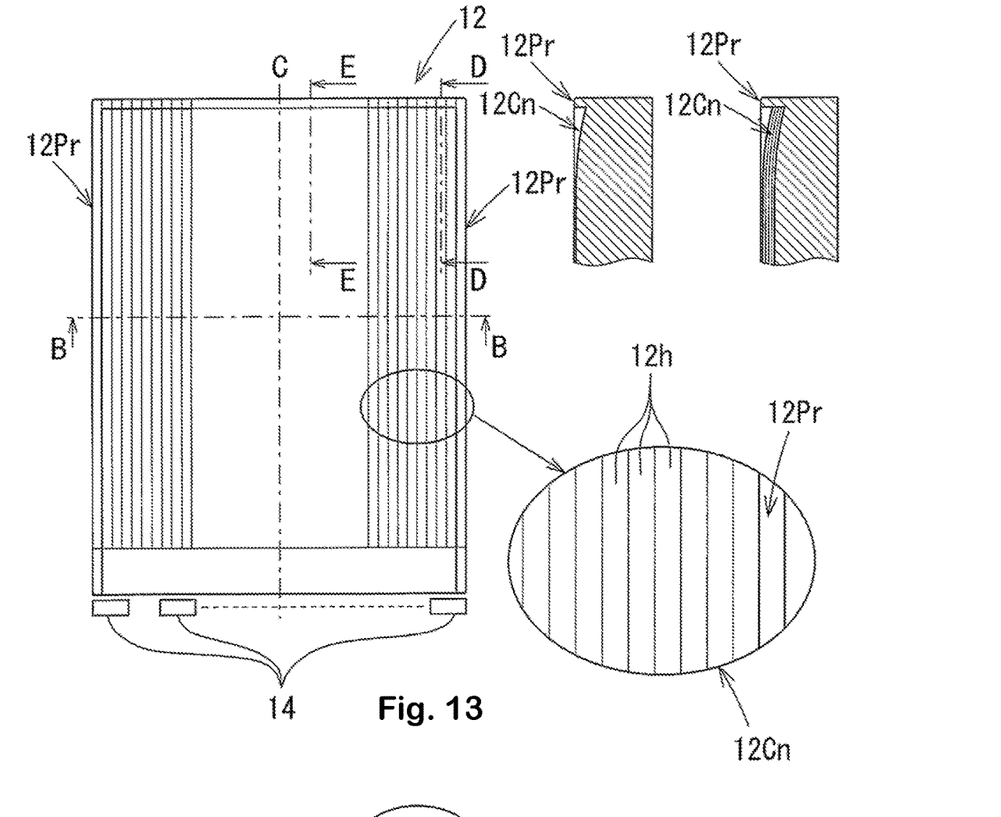
FIG. 13 is a top view of an embodiment of light guide plate of FIG. 2 illustrating convex-strip shaped parts.
Figure 14:
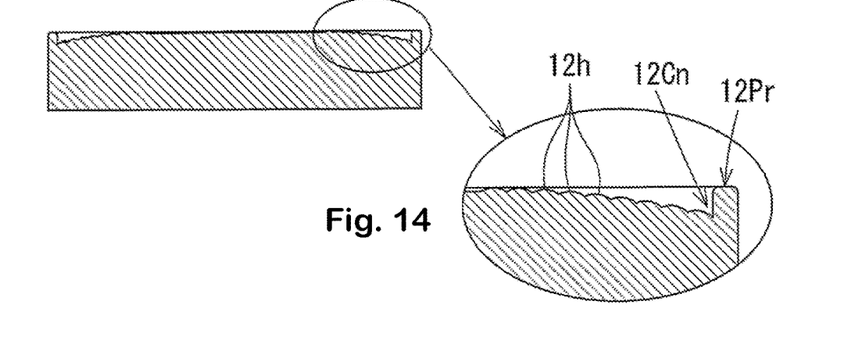
FIG. 14 is a cross section of the light guide plate of FIG. 13 taken along line B-B.

On one among the pair of opposing principal surfaces 12a and 12b of the light guide plate 12, a plurality of convex strip-shaped parts 12h, illustrated in FIGS. 13 and 14, may be provided extending from the incident light surface 12c (refer to FIG. 10) side of the light guide plate toward the end surface 12e (refer to FIG. 10) opposing the incident light surface 12c.

Figure 7:
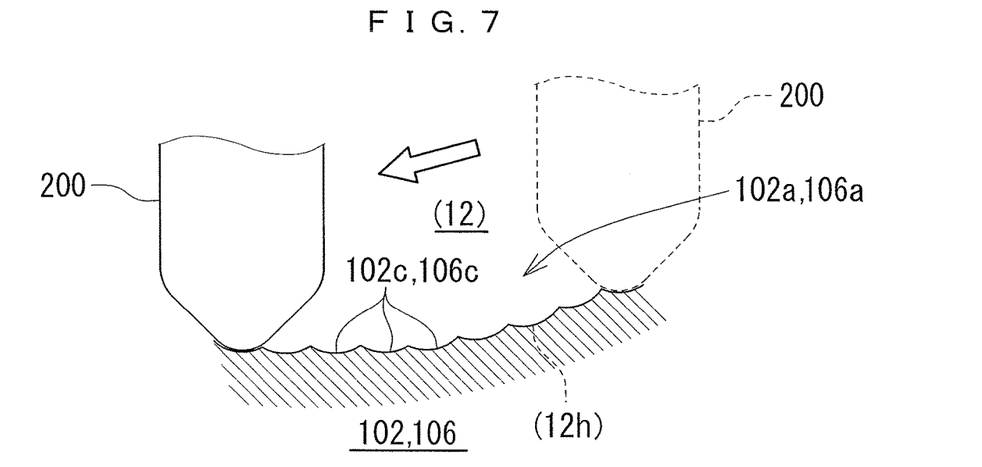
FIG. 7 is an explanatory view illustrating an example of the steps for processing the metallic molds of FIGS. 4 to 6.

In the case of this application example, as shown in FIG. 7, a plurality of grooves 102c, 106c are cut using a cutting tool (bite) 200 into the molding surface 102a of the fixed mold 102 or the molding surface 106a of the movable mold 106. Further, when cutting the grooves 102c, 106c, the height of each groove is individually adjusted. For example, by adjusting the height of the groove 102c, 106c at a portion corresponding to the center in a plan view of the pair of opposing principal surfaces 12a and 12b of light guide plate 12 to be the deepest and then gradually reducing the height of adjacent grooves 102c, 106c from the center toward the end surface 12f of the light guide plate 12, the protruding part 106b or the curved surface 102b is formed macroscopically as shown in FIGS. 4 to 6.

During injection compression molding, these grooves 102c, 106c are transferred to the molten resin filled in the cavity 108 of the metallic mold (refer to FIGS. 4 to 6), and thereby the plurality of convex strip-shaped parts 12h as described above are molded on one among the pair of opposing principal surfaces 12a and 12b of the light guide plate 12.

According to the present embodiment having the above-described structure, the following effects can be achieved.

In the spread illuminating apparatus 10 according to the present embodiment, the protruding part 12Pr that projects in the thickness direction and the recessed part 12Cn that is recessed in the thickness direction are shaped so as to form a pair on the principal surfaces 12a and 12b of the light guide plate 12 along the end surface 12f (12e) of the light guide plate 12. Thereby, the thickness of the portion along the end surface 12f of the principal surfaces 12a and 12b of the light guide plate 12 is intentionally determined by the protruding part 12Pr and the recessed part 12Cn. In other words, by determining the thickness of the portion along the end surface 12f of the principal surfaces 12a and 12b of the light guide plate by the protruding part 12Pr and the recessed part 12Cn, this thickness falls within an appropriate dimension range. Also, as will be explained later, the light guide plate 12 is molded by an injection compression molding method, and therein, the protruding part 12Pr is constituted by effectively utilizing a burr (refer to the burr 120BA in FIG. 12) formed so as to project from the principal surface 12a along the end surface 12f of the light guide plate 12.

However, the thickness of the portion along the end surface 12f of the principal surfaces 12a and 12b of the light guide plate 12 falls within an appropriate dimension range in relation to the recessed part 12Cn that forms a pair with the protruding part 12Pr. Therefore, the edges 181c, 182c, and 183c of the plurality of optical sheets 18 that are stacked on the emitting surface 12a of the light guide plate 12 do not rise up in the stacking direction of the optical sheets 18 due to the thickness of the portion along the end surface 12f of the light guide plate 12. Further, even if the optical sheets 18 do rise up slightly, the amount that the optical sheets 18 rise up is suppressed, and thus the negative effects caused by the burr are lessened.

In addition, the thickness of the light guide plate 12 decreases near the end of the light guide plate 12 due to the recessed part 12Cn provided along the end surface 12f of the light guide plate 12. Thereby, the amount of light that leaks from the end surface 12f of the light guide plate 12 is reduced, and the amount of light emitted from the emitting surface 12a is increased.

In outer words, by providing the protruding part 12Pr and the recessed part 12Cn so as to form a pair along the end surface 12f of the light guide plate 12, it becomes easy to dispose the optical sheets 18 in a nearly horizontal state across the entire width thereof, and it can be anticipated that the amount of light emitted from the emitting surface 12a will increase.

By providing the light blocking member 20 that defines an effective area of the emitting surface 12a of the light guide plate 12, the effective area is clarified. Further, by fixing the light blocking member 20 so that it spans across the outer edges of the optical sheets 18 and the upper surface 16a of the frame 16, the optical sheets 18 are fixed to the housing frame 16 via the light blocking member 20. In addition, by ensuring the dimensional accuracy in the thickness direction of the portion along the end surface 12f of the principal surfaces 12a and 12b of the light guide plate 12, the light blocking member 20 that is disposed spanning across the outer edges of the optical sheets 18 and the upper surface 16a of the housing frame 16 is not pushed up in a state in which the contact surface area between the light blocking member 20 and the upper surface 16a of the housing frame 16 is reduced at the outer edges of the optical sheets 18. Therefore, the light blocking member 20 can be reliably fixed to the upper surface 16a of the housing frame 16.

Even if the position of the BST 127 deviates and is adhered in a state in which it is sticking out from the principal surface 120b of the light guide plate, the thickness of the BST 127 can be absorbed by the recessed part 12Cn, and thus the same operational effects can be achieved.

By providing the protruding part 12Pr and the recessed part 12Cn along the end surface 12f that extends in a direction that intersects the incident light surface 12c of the light guide plate 12, at this end surface 12f, the edges 181c, 182c, and 183c of the plurality of optical sheets 18 stacked on the emitting surface 12a of the light guide plate 12 can be prevented from rising up in the stacking direction of the optical sheets 18 due to the thickness of the portion along the end surface 12f. Therefore, even if the frame edge is further narrowed, the necessary contact surface area between the light blocking member 20 and the housing frame 16 is secured at the end surface 12f that extends in a direction that intersects the incident light surface 12c of the light guide plate 12.

The protruding part 12Pr and the recessed part 12Cn provided so as to form a pair on the principal surfaces 12a and 12b of the light guide plate 12 are constituted such that the maximum height of the protruding part 12Pr is determined using the bottom surface that lies at the maximum depth of the recessed part 12Cn as a reference (refer to reference sign "da" in FIG. 2), and the maximum height H of the protruding part 12Pr is formed to match the maximum depth D of the recessed part 12Cn or is formed to be less than the maximum depth D of the recessed part 12Cn. In other words, the maximum height H of the protruding part 12Pr is formed to match or be less than the maximum depth D of the recessed part 12Cn. According to this structure, the maximum height H of the protruding part 12Pr, which determines the thickness dimension of the portion near the end surface 12f of the light guide plate 12, is equal to or less than a thickness dimension at the center in a plan view of the pair of opposing principal surfaces 12a and 12b of the light guide plate 12. Therefore, the edges 181c, 182c, and 183c of the plurality of optical sheets 18 stacked on the emitting surface 12a of the light guide plate 12 do not ride up onto the protruding part 12Pr and are not pushed up by the protruding part.

The dimension (W1-W2 in FIG. 2) of the recessed part 12Cn in a direction from the end surface 12f at which the protruding part 12Pr is provided toward the center in a plan view of the pair of opposing principal surfaces 12a and 12b of the light guide plate 12 is greater than the dimension (W2 in FIG. 2) of the protruding part 12Pr. In other words, the range occupied by the recessed part 12Cn on the principal surface 12a is wider than the range occupied by the protruding part 12Pr. Thereby, the plate thickness of the light guide plate 12 decreases gently in a direction from the center toward the end surface 12f at which the protruding part 12Pr is provided. As a result, the occurrence of bright lines on the emitting surface 12a of the light guide plate 12 caused by decreases in the plate thickness in the recessed part 12Cn can be avoided.

As shown in FIGS. 3 and 6, the recessed part 12Cn is formed over a wide range beginning from the center in a plan view of the pair of opposing principal surfaces 12a and 12b of the light guide plate 12 so that it reaches a maximum depth at or near the end surface 12f at which the protruding part 12Pr is formed. By forming the recessed part 12Cn so that the thickness thereof decreases gently over a wide range of the principal surfaces 12a and 12b, light from the light source 14 that has entered into the incident light surface 12c of the light guide plate 12 is refracted or reflected upon being subjected to deflection over a wide range by the shape of the recessed part 12Cn formed on the pair of opposing principal surfaces 12a and 12b, and thus the proportion of this light that becomes leaked light from the end surface 12f of the light guide plate 12 decreases.

In the case that the plurality of convex strip-shaped parts 12h that extend from the incident light surface 12c of the light guide plate 12 toward the opposing end surface 12e are provided on one among the pair of opposing principal surfaces 12a and 12b of the light guide plate 12 (refer to FIG. 7), light from the light source 14 that has entered into the incident light surface 12c of the light guide plate 12 is refracted or reflected upon being subjected to deflection by the convex strip-shaped parts 12h, and then the light is diffused irregularly in a direction parallel to the incident light surface 12c. This facilitates the uniformity of light that is emitted from the emitting surface 12a of the light guide plate 12. Further, by individually adjusting the height of each of the plurality of convex strip-shaped parts 12h, the thickness of the light guide plate 12 differs, and thereby the recessed part 12Cn and the protruding part 12Pr are formed as the overall shape of the light guide plate 12.

Further, the grooves 102c, 106c are cut with the cutting tool 200 into the surface of the metallic die 100A1, 100A2, 100A3 for injection molding, and these grooves 102c, 106c are transferred to the molten resin that is filled into the cavity 108 of the metallic mold, thereby forming the recessed part 12Cn and the protruding part 12Pr as the overall shape of the light guide plate 12. Therefore, the step for processing the metallic die in order to form the recessed part 12Cn and the protruding part 12Pr becomes consolidated into the step for cutting the grooves 102c, 106c with the cutting tool 200.

The spread illuminating apparatus according to the present invention is not limited to an embodiment in which both the protruding part 12Pr and the recessed part 12Cn are provided on the emitting surface 12a of the light guide plate 12 as shown in FIGS. 1 and 2, and the protruding part 12Pr may be provided on one among the pair of principal surfaces 12a and 12b and the recessed part 12Cn may be provided on the other principal surface as shown in FIG. 3. In this embodiment, since the protruding part 12Pr and the recessed part 12Cn are provided to form a pair along the end surface 12f of the light guide plate 12, in the state in which the light guide plate 12 is incorporated into the spread illuminating apparatus 10, the protruding part 12Pr formed on one of the principal surfaces elastically deforms with the recessed part 12Cn provided on the other principal surface as a deformation margin. Thereby, the light guide plate 12 is corrected in a direction in which it becomes flat and the protruding amount of the protruding part 12Pr is reduced.

Further application examples having the same objective as the above-described embodiments of the present invention are illustrated in FIG. 8. With regard to the schematic structure of the spread illuminating apparatus 10, refer to FIG. 10.

These examples each include a light guide plate 12 in which one principal surface (12a in these examples) among a pair of opposing principal surfaces 12a and 12b is a light emitting surface, a plurality of optical sheets 18 that are stacked on the emitting surface 12a, a light source 14 disposed opposing an incident light surface of the light guide plate 12, and a frame 16 for accommodating the above-mentioned constituent elements. The light guide plate 12 is molded by an injection compression molding method. A notch is provided on an outer edge of at least one of the plurality of optical sheets 181, 182, and 183 toward the center in a plan view of the optical sheets 18.

Figure 8A:
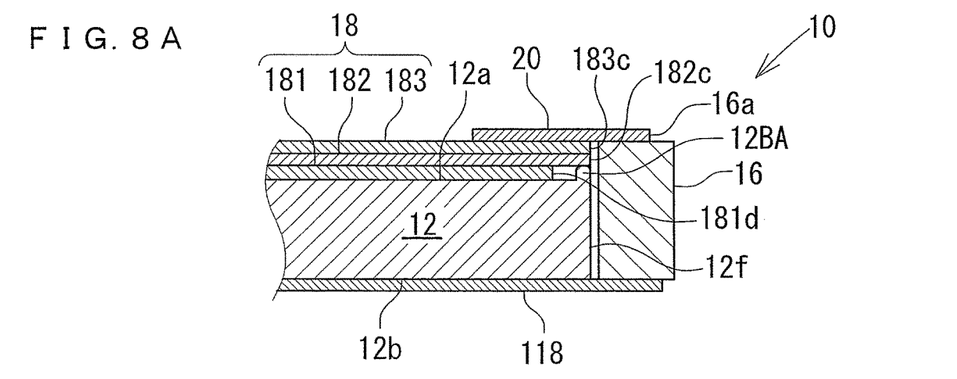
FIGS. 8A and 8B are sectional views of the essential parts of other examples of a spread illuminating apparatus according to an embodiment of the present invention.

In the example of FIG. 8A, a notch 181d is provided in the optical sheet 181 of the first layer closest to the light guide plate 12 among the plurality of stacked optical sheets 181, 182, and 183. In this case, the optical sheet 181 will not ride up onto the burr 12BA, and the outer edges of the other stacked optical sheets 182 and 183 of the second layer and above will maintain their flat shape as illustrated in FIG. 8A. Further, even if the optical sheets 182 and 183 of the second layer and above rise up slightly because the projecting height of the burr 12BA from the emitting surface 12a of the light guide plate 12 exceeds the thickness of the optical sheet 181, the amount that the optical sheets 182 and 183 rise up is suppressed, and thus any negative effects are lessened.

Figure 8B:
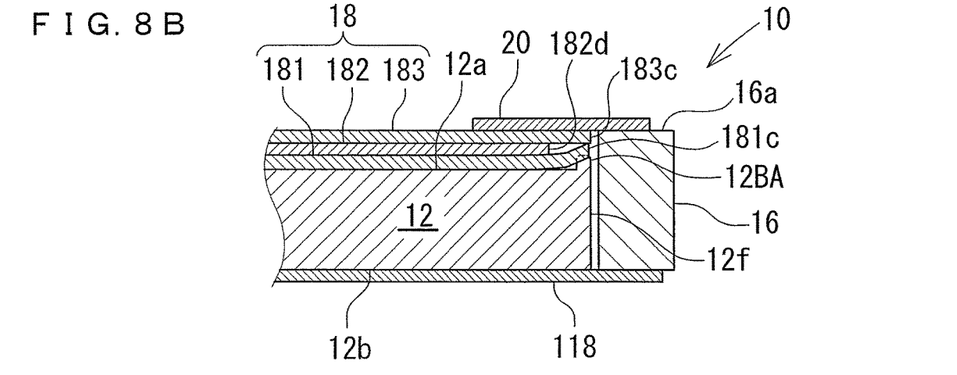

In the example of FIG. 8B, a notch 182d is provided in the optical sheet 182 of the second layer. In this case, the optical sheet 181 of the first layer may ride up onto the burr 12BA and rise up, but the portion at which the optical sheet 181 of the first layer has risen up is avoided by the notch 182d of the optical sheet 182 of the second layer, and thus the outer edge of the optical sheet 182 of the second layer does not rise up or the amount by which it rises up is suppressed.

Thus, according to the above-described application examples, the burr 12BA, which projects in the thickness direction of the light guide plate 12 and is formed along the outer shape of the light guide plate 12 when the light guide plate 12 is molded by an injection compression molding method, can be avoided by the notch 181d, 182d provided on the outer edge of at least one of the optical sheets 18 toward the center in a plan view of the optical sheets 18. Therefore, the occurrence of deviations between the height position of the outer edges of the plurality of stacked optical sheets 18 and the height position of the upper surface 16a of the housing frame 16 caused by the optical sheets 18 riding up onto the burr 12BA can be avoided.

Depending on the projecting amount of the burr 12BA, the projecting part of the burr 12BA can be sufficiently neutralized across all of the plurality of stacked optical sheets 18 by providing a notch at the same place in two or more of the optical sheets 18.

Figures 9A, 9B:
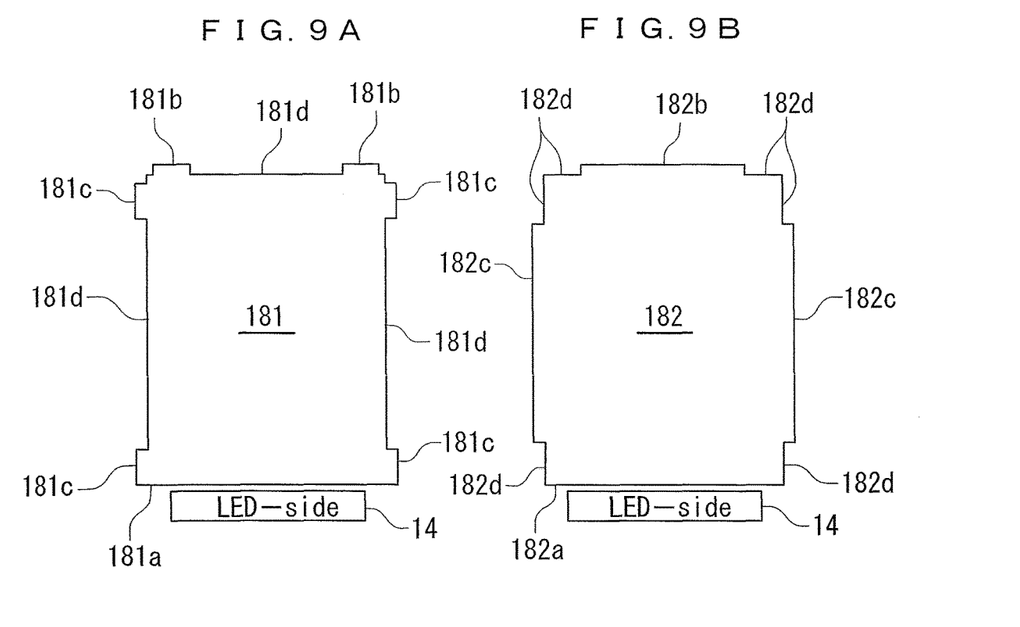
FIG. 9A to 9D are sectional views of the optical sheets of the spread illuminating apparatus shown in FIG. 8, wherein the optical sheets shown in FIGS. 9A and 9B are used as a set and the optical sheets shown in FIGS. 9C and 9D are used as a set.
Figure 9C:
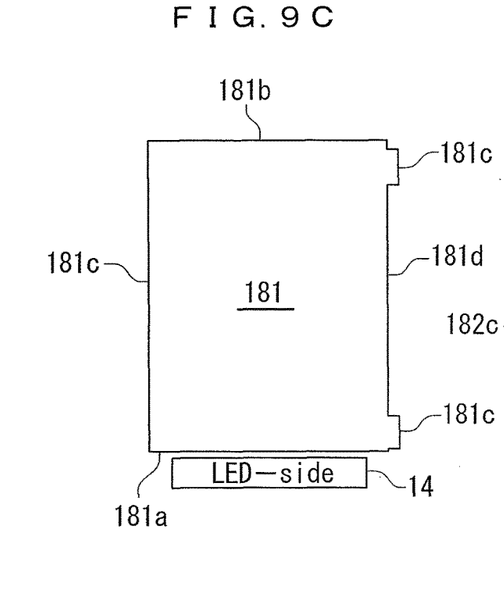
Figure 9D:
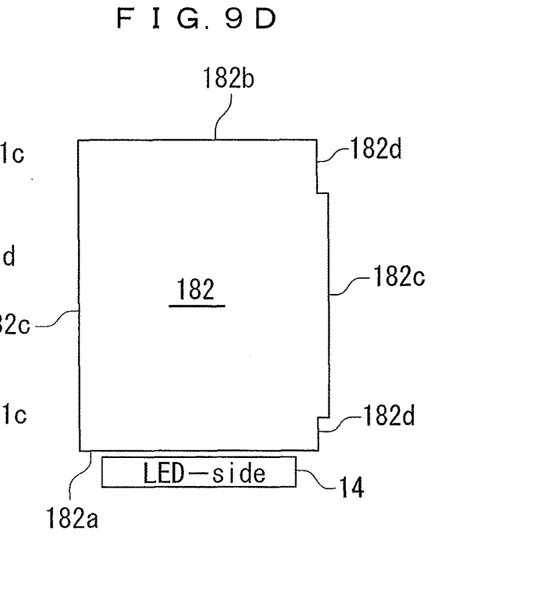

FIG. 9A to 9D illustrate plan views of the optical sheets used in the application examples of FIG. 8. Herein, FIGS. 9A and 9B illustrate an embodiment in which the notches 181d and 182d are provided on three sides of the optical sheets 181 and 182 excluding the side opposing the light source 14 in a state in which the optical sheets 181 and 182 are incorporated in the spread illuminating apparatus 10, and these optical sheets 181 and 182 are used as a set. Further, FIGS. 9C and 9D illustrate an embodiment in which the notches 181d and 182d are provided on only one side of the optical sheets 181 and 182 that intersects the side opposing the light source 14, and these optical sheets 181 and 182 are used as a set.

As shown in FIG. 9, the notches 181d and 182d are provided in the two optical sheets 181 and 182, and the notches 181d formed in the one optical sheet 181 are provided at locations that do not overlap with the notches 182d formed in the other optical sheet 182 in a plan view of the optical sheets 18.

According to these structures, at the locations at which the notches 181d and 182d are provided in the optical sheets 181 and 182, the effects of the burr 12BA at the outer edges of the optical sheets 18 caused by the edges 181b, 181c, 182b, and 182c of the optical sheets 181 and 182 retreating toward the center in a plan view of the optical sheets 181 and 182 are reliably avoided. In other words, by providing the notches 181d formed in the one optical sheet 181 and the notches 182d formed in the other optical sheet 182 at locations that do not overlap each other in a plan view of the optical sheets 181 and 182, the burr 12BA or the rising up of the optical sheets 181 due to the burr 12BA is reliably avoided by one of the notches 181d, 182d in the optical sheets regardless of where the burr 12BA exists.

FIG. 9A is an application example in a case in which the burr 12BA exists on three end surfaces 12e, 12f excluding the incident light surface 12c of the light guide plate 12, and FIG. 9B is an application example in a case in which the burr 12BA exists only on the one end surface 12f of the light guide plate 12 (a case in which an operation to remove the burr 12BA on the other end surfaces is performed). It should be understood that the application examples of FIG. 8 and FIGS. 9A to 9D can be used together with the embodiments explained in FIGS. 1 to 7.

What is claimed is:

1. A spread illuminating apparatus comprising:
   a light guide plate in which one principal surface among a pair of opposing principal surfaces is a light emitting surface;
   at least one piece of optical sheet that is stacked on the emitting surface;
   a light source disposed opposing an incident light surface of the light guide plate; and
   a frame for accommodating the light guide plate,
   wherein on the principal surfaces of the light guide plate, a protruding part that projects in a thickness direction and a recessed part that is recessed in the thickness direction are provided so as to form a pair at least along an end surface of the light guide plate extending in a direction that intersects an end surface serving as the incident light surface of the light guide plate, or along an end surface that opposes the incident light surface of the light guide plate.

2. The spread illuminating apparatus according to claim 1, further comprising a light blocking member that defines an effective area of the emitting surface of the light guide plate, wherein the light blocking member is fixed spanning across outer edge of the at least one piece of optical sheet and an upper surface of the frame.

3. The spread illuminating apparatus according to claim 1, wherein, using a bottom surface that lies at a maximum depth of the recessed part as a reference, a maximum height of the protruding part is formed to match a maximum depth of the recessed part or is formed to be less than the maximum depth of the recessed part.

4. The spread illuminating apparatus according to claim 1, wherein a dimension of the protruding part and a dimension of the recessed part in a direction from the end surface at which the protruding part and the recessed part are provided toward a center in a plan view of the pair of opposing principal surfaces of the light guide plate are formed such that the dimension of the recessed part is greater than the dimension of the protruding part.

5. The spread illuminating apparatus according to claim 1, wherein the recessed part is formed so as to gradually become deeper beginning at the center in a plan view of the pair of opposing principal surfaces of the light guide plate toward the end surface at which the protruding part is provided, the recessed part reaching a maximum depth at or near the end surface.

6. The spread illuminating apparatus according to claim 1, wherein a plurality of convex strip-shaped parts extending from the end surface serving as the incident light surface of the light guide plate toward an opposing end surface are provided on one principal surface among the pair of opposing principal surfaces of the light guide plate.

7. The spread illuminating apparatus according to claim 1, wherein both the protruding part and the recessed part are provided on one principal surface among the pair of opposing principal surfaces of the light guide plate such that the recessed part is positioned on the inside of the protruding part in a plan view of the principal surface.

8. The spread illuminating apparatus according to claim 1, wherein one or both of the protruding part and the recessed part is/are provided on the principal surface side serving as the emitting surface of the light guide plate or on the other principal surface side.

9. A spread illuminating apparatus comprising:
a light guide plate in which one principal surface among a pair of opposing principal surfaces is a light emitting surface;
at least one piece of optical sheet that is stacked on the emitting surface;
a light source disposed opposing an incident light surface of the light guide plate; and
a frame for accommodating the light guide plate,
wherein on the principal surfaces of the light guide plate, a protruding part that projects in a thickness direction and a recessed part that is recessed in the thickness direction are provided so as to form a pair along an end surface of the light guide plate, and
wherein the recessed part is formed so as to gradually become deeper beginning at the center in a plan view of the pair of opposing principal surfaces of the light guide plate toward the end surface at which the protruding part is provided, the recessed part reaching a maximum depth at or near the end surface.

10. The spread illuminating apparatus according to claim 9, further comprising a light blocking member that defines an effective area of the emitting surface of the light guide plate, wherein the light blocking member is fixed spanning across outer edge of the at least one piece of optical sheet and an upper surface of the frame.

11. The spread illuminating apparatus according to claim 9, wherein, using a bottom surface that lies at a maximum depth of the recessed part as a reference, a maximum height of the protruding part is formed to match a maximum depth of the recessed part or is formed to be less than the maximum depth of the recessed part.

12. The spread illuminating apparatus according to claim 9, wherein a dimension of the protruding part and a dimension of the recessed part in a direction from the end surface at which the protruding part and the recessed part are provided toward a center in a plan view of the pair of opposing principal surfaces of the light guide plate are formed such that the dimension of the recessed part is greater than the dimension of the protruding part.

13. The spread illuminating apparatus according to claim 9, wherein a plurality of convex strip-shaped parts extending from the end surface serving as the incident light surface of the light guide plate toward an opposing end surface are provided on one principal surface among the pair of opposing principal surfaces of the light guide plate.

14. The spread illuminating apparatus according to claim 9, wherein both the protruding part and the recessed part are provided on one principal surface among the pair of opposing principal surfaces of the light guide plate such that the recessed part is positioned on the inside of the protruding part in a plan view of the principal surface.

15. The spread illuminating apparatus according to claim 9, wherein one or both of the protruding part and the recessed part is/are provided on the principal surface side serving as the emitting surface of the light guide plate or on the other principal surface side.

16. A spread illuminating apparatus comprising:
a light guide plate in which one principal surface among a pair of opposing principal surfaces is a light emitting surface;
at least one piece of optical sheet that is stacked on the emitting surface;
a light source disposed opposing an incident light surface of the light guide plate; and
a frame for accommodating the light guide plate,
wherein on the principal surfaces of the light guide plate, a protruding part that projects in a thickness direction and a recessed part that is recessed in the thickness direction are provided so as to form a pair along an end surface of the light guide plate, and
wherein a plurality of convex strip-shaped parts extending from the end surface serving as the incident light surface of the light guide plate toward an opposing end surface are provided on one principal surface among the pair of opposing principal surfaces of the light guide plate.

17. The spread illuminating apparatus according to claim 16, further comprising a light blocking member that defines an effective area of the emitting surface of the light guide plate, wherein the light blocking member is fixed spanning across outer edge of the at least one piece of optical sheet and an upper surface of the frame.

18. The spread illuminating apparatus according to claim 16, wherein, using a bottom surface that lies at a maximum depth of the recessed part as a reference, a maximum height of the protruding part is formed to match a maximum depth of the recessed part or is formed to be less than the maximum depth of the recessed part.

19. The spread illuminating apparatus according to claim 16, wherein a dimension of the protruding part and a dimension of the recessed part in a direction from the end surface at which the protruding part and the recessed part are provided toward a center in a plan view of the pair of opposing principal surfaces of the light guide plate are formed such that the dimension of the recessed part is greater than the dimension of the protruding part.

20. The spread illuminating apparatus according to claim 16, wherein both the protruding part and the recessed part are provided on one principal surface among the pair of opposing principal surfaces of the light guide plate such that the recessed part is positioned on the inside of the protruding part in a plan view of the principal surface.

21. The spread illuminating apparatus according to claim 16, wherein one or both of the protruding part and the recessed part is/are provided on the principal surface side serving as the emitting surface of the light guide plate or on the other principal surface side.

\* \* \* \* \*